United States Patent
Atala et al.

(10) Patent No.: US 10,407,050 B2
(45) Date of Patent: Sep. 10, 2019

(54) AUXILIARY POWER SUPPLY FOR HYBRID ELECTRIC VEHICLE

(71) Applicant: FORD GLOBAL TECHNOLOGIES, LLC, Dearborn, MI (US)

(72) Inventors: Hosam Atala, Dearborn, MI (US); Mark J. Ferrel, Brighton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 158 days.

(21) Appl. No.: 15/627,661

(22) Filed: Jun. 20, 2017

(65) Prior Publication Data

US 2018/0362016 A1 Dec. 20, 2018

(51) Int. Cl.
*B60W 20/13* (2016.01)
*B60L 50/64* (2019.01)

(52) U.S. Cl.
CPC .............. *B60W 20/13* (2016.01); *B60L 50/64* (2019.02); *B60L 2210/40* (2013.01); *B60W 2510/085* (2013.01); *B60W 2710/086* (2013.01)

(58) Field of Classification Search
None
See application file for complete search history.

(56) References Cited

U.S. PATENT DOCUMENTS

| 6,630,810 | B2 | 10/2003 | Takemasa et al. |
| 8,525,492 | B2 | 9/2013 | Peterson et al. |
| 2007/0141999 | A1* | 6/2007 | Przywecki ............. B60R 16/03 455/82 |
| 2009/0183934 | A1* | 7/2009 | Oyobe .................... B60K 6/26 180/65.265 |
| 2013/0006453 | A1* | 1/2013 | Wang ............... B60W 50/0205 701/22 |
| 2015/0054337 | A1 | 2/2015 | Ogale |
| 2017/0369049 | A1* | 12/2017 | Bae ....................... B60W 20/15 |

* cited by examiner

*Primary Examiner* — Jonathan M Dager
*Assistant Examiner* — Garrett F Evans
(74) *Attorney, Agent, or Firm* — David Kelley; Brooks Kushman P.C.

(57) ABSTRACT

A vehicle includes a first electric machine configured to generate low-voltage power. The vehicle includes a second electric machine configured to generate high-voltage power. The vehicle includes a power converter configured to convert high-voltage power generated by a second electric machine to low-voltage power. The vehicle includes a controller programmed to, responsive to a low-voltage power demand exceeding a limit of the power converter, operate the first electric machine and the power converter to satisfy the demand, and otherwise, responsive to the power converter being operational, operate only the power converter to satisfy the demand.

20 Claims, 3 Drawing Sheets

US 10,407,050 B2

AUXILIARY POWER SUPPLY FOR HYBRID ELECTRIC VEHICLE

TECHNICAL FIELD

This application generally relates to a power supply in a hybrid electric vehicle configured to supplement power to a low-voltage power bus.

BACKGROUND

Hybrid-electric vehicles (HEV) utilize components that draw power from a high-voltage power bus and a low-voltage power bus. The source of power for the low-voltage power bus is derived from the high-voltage power bus. When sufficient power cannot be transferred from the high-voltage power bus to the low-voltage power bus, batteries connected to the low-voltage power bus may temporarily provide power but eventually become depleted. Once the batteries are depleted, components drawing power from the low-voltage power bus become inoperable.

SUMMARY

A vehicle includes a first electric machine configured to generate low-voltage power. The vehicle further includes a controller programmed to, (i) responsive to a low-voltage power demand exceeding a limit of a power converter configured to convert high-voltage power generated by a second electric machine to low-voltage power, operate the first electric machine and the power converter to satisfy the demand, and (ii) otherwise, responsive to the power converter being operational, operate only the power converter to satisfy the demand.

The controller may be further programmed to, operate the first electric machine to generate an amount of power that is a difference between the demand and the limit. The controller may be further programmed to, responsive to the power converter being unable to convert high-voltage power to low-voltage power, operate only the first electric machine to satisfy the demand. The controller may be further programmed to operate the first electric machine to generate an amount of power that is the lesser of the demand and a power limit of the first electric machine. The controller may be further programmed to, responsive to the demand exceeding the limit and an engine coupled to the first electric machine being stopped, operate the first electric machine to crank the engine. The controller may be further programmed to, operate an engine coupled to the first electric machine at a speed that is at least a predetermined speed configured to cause the first electric machine to generate an amount of power to satisfy the demand. The limit may be less than a maximum possible low-voltage power demand. A sum of the limit and a power capability of the first electric machine may be at least equal a maximum possible low-voltage power.

A method includes converting, by a power converter, high-voltage power generated by a first electric machine to low-voltage power. The method further includes operating the power converter and a second electric machine that is configured to generate low-voltage power responsive to a low-voltage power demand exceeding a limit of the power converter. The method further includes operating only the power converter to satisfy the demand otherwise, responsive to the power converter being operational.

The method may further include operating the second electric machine to crank an engine that is coupled to the second electric machine responsive to the demand exceeding the limit and the engine being stopped. The method may further include operating only the second electric machine to generate low-voltage power responsive to the power converter being unable to convert high-voltage power to low-voltage power. An amount of power generated by the second electric machine may be a lesser of the low-voltage power demand and a power limit of the second electric machine. The method may further include operating an engine coupled to the second electric machine at a speed that is at least a predetermined speed configured to cause the second electric machine to generate an amount of low-voltage power to satisfy the demand. The method may further include cranking an engine that is coupled to the second electric machine responsive to the engine being stopped. The limit may be less than a maximum possible low-voltage power demand.

A vehicle includes a first electric machine configured to generate low-voltage power and a power converter configured to convert high-voltage power generated by a second electric machine to low-voltage power. The vehicle further includes a controller programmed to, responsive to the power converter being unable to convert high-voltage power to low-voltage power, operate the first electric machine to generate an amount of power to satisfy a low-voltage power demand.

The controller may be further programmed to operate the first electric machine to generate the amount of power that is the lesser of the low-voltage power demand and a power limit of the first electric machine. The controller may be further programmed to, responsive to the power converter being able to convert high-voltage power to low-voltage power and the low-voltage power demand exceeding a limit of the power converter, operate the first electric machine and the power converter to satisfy the low-voltage power demand. The limit may be less than a maximum possible low-voltage power demand. Operating the first electric machine may include operating an engine configured to drive the first electric machine at a speed that is at least a predetermined speed configured to cause the first electric machine to generate the amount of power.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
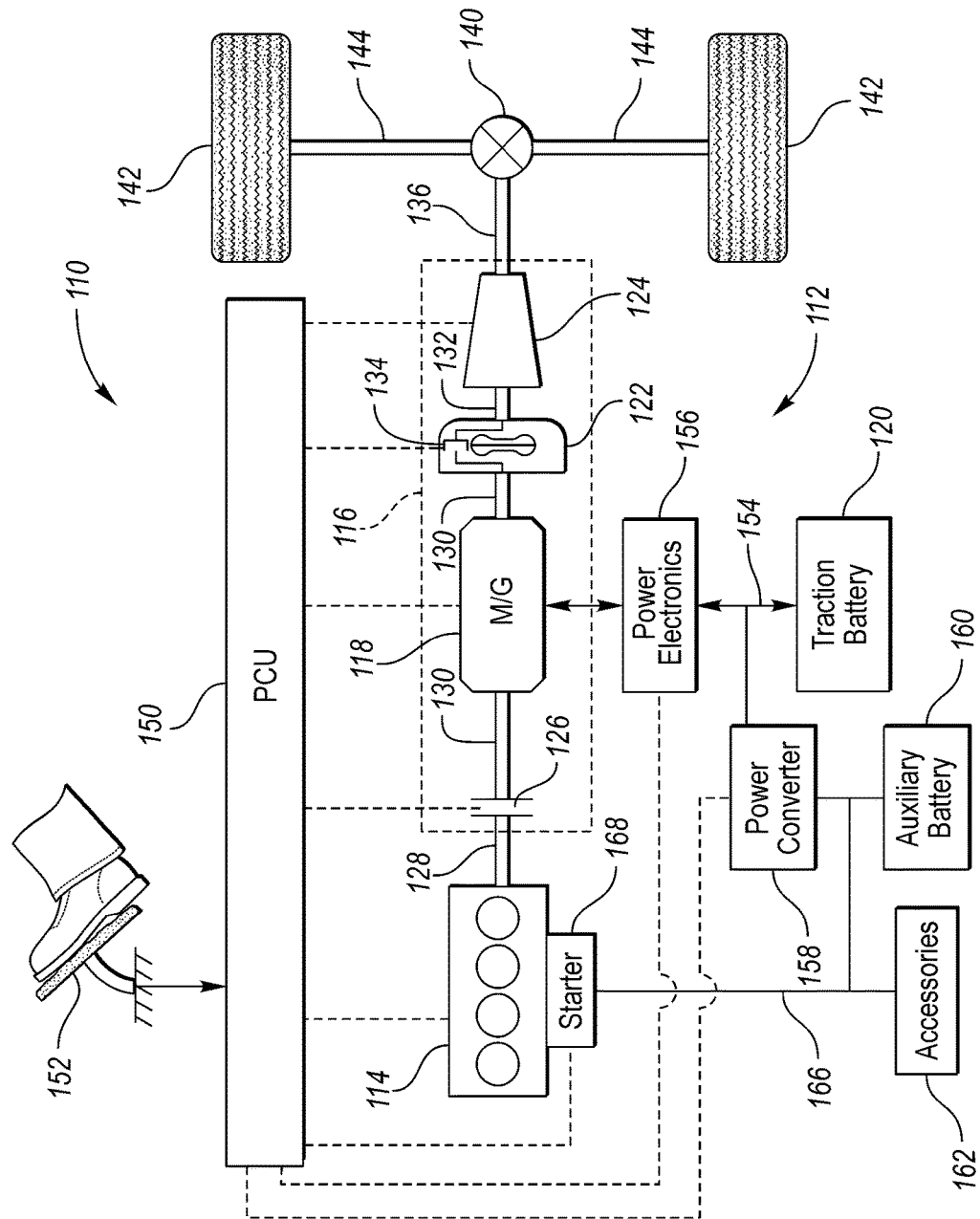
FIG. 1 is a block diagram of a vehicle with a hybrid powertrain.

Referring to FIG. 1, a schematic diagram of a hybrid electric vehicle (HEV) 110 is illustrated according to an embodiment of the present disclosure. FIG. 1 illustrates representative relationships among the components. Physical placement and orientation of the components within the vehicle may vary. The HEV 110 includes a powertrain 112. The powertrain 112 includes an engine 114 that drives a transmission 116, which may be referred to as a modular hybrid transmission (MHT). As will be described in further detail below, transmission 116 includes an electric machine such as an electric motor/generator (M/G) 118, an associated traction battery 120, a torque converter 122, and a multiple step-ratio automatic transmission, or gearbox 124.

The engine 114 and the M/G 118 are both drive sources for the HEV 110. The engine 114 generally represents a power source that may include an internal combustion engine such as a gasoline, diesel, or natural gas powered engine, or a fuel cell. The engine 114 generates an engine power and corresponding engine torque that is supplied to the M/G 118 when a disconnect clutch 126 between the engine 114 and the M/G 118 is at least partially engaged. The M/G 118 may be implemented by any one of a plurality of types of electric machines. For example, M/G 118 may be a permanent magnet synchronous motor. Power electronics 156 condition direct current (DC) power provided by the traction battery 120 to the requirements of the M/G 118, as will be described below. For example, power electronics may provide three phase alternating current (AC) to the M/G 118.

When the disconnect clutch 126 is at least partially engaged, power flow from the engine 114 to the M/G 118 or from the M/G 118 to the engine 114 is possible. For example, the disconnect clutch 126 may be engaged and M/G 118 may operate as a generator to convert rotational energy provided by a crankshaft 128 and M/G shaft 130 into electrical energy to be stored in the traction battery 120. The disconnect clutch 126 can also be disengaged to isolate the engine 114 from the remainder of the powertrain 112 such that the M/G 118 can act as the sole drive source for the HEV 110. The M/G shaft 130 extends through the M/G 118. The M/G 118 is continuously drivably connected to the M/G shaft 130, whereas the engine 114 is drivably connected to the M/G shaft 130 only when the disconnect clutch 126 is at least partially engaged.

The M/G 118 is connected to the torque converter 122 via M/G shaft 130. The torque converter 122 is therefore connected to the engine 114 when the disconnect clutch 126 is at least partially engaged. The torque converter 122 includes an impeller fixed to M/G shaft 130 and a turbine fixed to a transmission input shaft 132. The torque converter 122 thus provides a hydraulic coupling between shaft 130 and transmission input shaft 132. The torque converter 122 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 134 may also be provided that, when engaged, frictionally or mechanically couples the impeller and the turbine of the torque converter 122, permitting more efficient power transfer. The torque converter bypass clutch 134 may be operated as a launch clutch to provide smooth vehicle launch. Alternatively, or in combination, a launch clutch similar to disconnect clutch 126 may be provided between the M/G 118 and gearbox 124 for applications that do not include a torque converter 122 or a torque converter bypass clutch 134. In some applications, disconnect clutch 126 is generally referred to as an upstream clutch and launch clutch 134 (which may be a torque converter bypass clutch) is generally referred to as a downstream clutch.

The gearbox 124 may include gear sets (not shown) that are selectively placed in different gear ratios by selective engagement of friction elements such as clutches and brakes (not shown) to establish the desired multiple discrete or step drive ratios. The gearbox 124 may provide a predetermined number of gear ratios that may range from a low gear (e.g., first gear) to a highest gear (e.g., Nth gear). An upshift of the gearbox 124 is a transition to a higher gear. A downshift of the gearbox 124 is a transition to a lower gear. The friction elements may be controlled according to a shift schedule that sequences connecting and disconnecting certain elements of the gear sets to control the ratio between a transmission output shaft 136 and the transmission input shaft 132. The gearbox 124 is automatically shifted from one ratio to another based on various vehicle and ambient operating conditions by an associated controller 150, such as a powertrain control unit (PCU). The gearbox 124 then provides powertrain output torque to output shaft 136.

It should be understood that the hydraulically controlled gearbox 124 used with a torque converter 122 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 124 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 136 is connected to a differential 140. The differential 140 drives a pair of wheels 142 via respective axles 144 connected to the differential 140. The differential 140 transmits approximately equal torque to each wheel 142 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 112 may further include an associated powertrain control unit (PCU) 150. While illustrated as one controller, the PCU may be part of a larger control system and may be controlled by various other controllers throughout the vehicle 110, such as a vehicle system controller (VSC). It should therefore be understood that the powertrain control unit 150 and one or more other controllers can collectively be referred to as a "controller" that controls various actuators in response to signals from various sensors to control functions such as starting/stopping engine 114, operating M/G 118 to provide wheel torque or charge the traction battery 120, select or schedule transmission shifts, etc. Controller 150 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The PCU 150 communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, the PCU 150 may communicate signals to and/or from engine 114, disconnect clutch 126, M/G 118, launch clutch 134, transmission gearbox 124, and power electronics 156. Although not explicitly illustrated, those of ordinary skill in the art will recognize various functions or components that may be controlled by the PCU 150 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an air conditioning compressor, battery charging, regenerative braking, M/G operation, clutch pressures for disconnect clutch 126, launch clutch 134, and transmission gearbox 124, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 134 status (TCC), deceleration or shift mode (MDE), for example.

Control logic or functions performed by the PCU 150 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as the PCU 150. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 152 is used by the driver of the vehicle to provide a demanded torque, power, or drive command to propel the vehicle 110. In general, depressing and releasing the accelerator pedal 152 generates an accelerator pedal position signal that may be interpreted by the PCU 150 as a demand for increased power or decreased power, respectively. Based at least upon input from the pedal, the PUC 150 commands torque from the engine 114 and/or the M/G 118. The PCU 150 also controls the timing of gear shifts within the gearbox 124, as well as engagement or disengagement of the disconnect clutch 126 and the torque converter bypass clutch 134 Like the disconnect clutch 126, the torque converter bypass clutch 134 can be modulated across a range between the engaged and disengaged positions. This produces a variable slip in the torque converter 122 in addition to the variable slip produced by the hydrodynamic coupling between the impeller and the turbine. Alternatively, the torque converter bypass clutch 134 may be operated as locked or open without using a modulated operating mode depending on the particular application.

To drive the vehicle 110 with the engine 114, the disconnect clutch 126 is at least partially engaged to transfer at least a portion of the engine torque through the disconnect clutch 126 to the M/G 118, and then from the M/G 118 through the torque converter 122 and gearbox 124. The M/G 118 may assist the engine 114 by providing additional power to turn the shaft 130. This operation mode may be referred to as a "hybrid mode" or an "electric assist mode."

To drive the vehicle 110 with the M/G 118 as the sole power source, the power flow remains the same except the disconnect clutch 126 is operated to isolate the engine 114 from the remainder of the powertrain 112. Combustion in the engine 114 may be disabled or otherwise OFF during this time to conserve fuel. The traction battery 120 transmits stored electrical energy through a high-voltage (HV) bus 154 to a power electronics module 156 that may include an inverter, for example. The high-voltage bus 154 includes wiring and conductors for conducting current between modules and may include a positive-side conductor and a negative- or return-side conductor. The power electronics 156 convert DC voltage from the traction battery 120 into AC voltage to be used by the M/G 118. The controller 150 commands the power electronics 156 to convert voltage from the traction battery 120 to an AC voltage provided to the M/G 118 to provide positive or negative torque to the shaft 130. This operation mode may be referred to as an "electric only" operation mode.

In any mode of operation, the M/G 118 may act as a motor and provide a driving force for the powertrain 112. Alternatively, the M/G 118 may act as a generator and convert kinetic energy from the powertrain 112 into electric energy to be supplied to the high-voltage bus 154 and/or stored in the traction battery 120. The M/G 118 may act as a generator while the engine 114 is providing propulsion power for the vehicle 110, for example. The M/G 118 may additionally act as a generator during times of regenerative braking in which rotational energy from wheels 142, while rotating, is transferred back through the gearbox 124 and is converted into electrical energy for storage in the traction battery 120.

It should be understood that the schematic illustrated in FIG. 1 is merely exemplary and is not intended to be limiting. Other configurations are contemplated that utilize selective engagement of both an engine and a motor to transmit torque through the transmission. For example, the M/G 118 may be offset from the crankshaft 128, an additional motor may be provided to start the engine 114, and/or the M/G 118 may be provided between the torque converter 122 and the gearbox 124. Other configurations are contemplated without deviating from the scope of the present disclosure. Other hybrid vehicle configurations are possible (e.g., power-split configuration) and the inventive aspects disclosed herein are applicable to these other configurations.

The vehicle 110 may utilize the M/G 118 to start the engine 114. The controller 150 may command the disconnect clutch 126 to close and request torque from the M/G 118 via the power electronics 156. The torque from the M/G 118 rotates the engine 114 so that the engine speed increases above a predetermined speed at which time the engine 114 may be commanded to provide fuel and spark to maintain continued engine rotation. The torque converter 122 may provide some torsional isolation during engine cranking and initial startup.

A low-voltage starter system 168 may also be coupled to the engine 114 to provide a secondary or backup means of starting the engine 114. The low-voltage starter system 168 may be a belt-integrated starter/generator (BISG) system. An electric machine may be coupled to the engine 114 via a belt that is routed via pulleys. The belt may be configured to couple the engine 114 and the electric machine so that they rotate together. Further, a clutch may be present that is configured to engage and disengage rotation of the electric machine. For example, the electric machine may be disengaged when there is no demand for starting the engine 114 or generating power. The electric machine may be configured to generate electrical power when the belt is being driven by engine power. The electric machine may be configured to drive the belt to cause rotation of the engine crankshaft for starting the engine 114. The low-voltage starter system 168 may include a control module that includes a power conversion system configured to transfer power between the electric machine and a vehicle power bus.

The vehicle 110 may further include a power converter module 158 and at least one auxiliary battery 160. The auxiliary battery 160 may be low-voltage battery such as a 12 Volt battery that is commonly used in automobiles. Terminals of the auxiliary battery 160 may be electrically coupled to a low-voltage power network or bus 166. The low-voltage power network 166 includes wiring and conductors for conducting current between connected modules. The power converter 158 may be electrically coupled between the high-voltage bus 154 and the low-voltage power bus 166. The power converter 158 may be configured to transfer power from the high-voltage bus 154 to the low-voltage power bus 166. The power converter 158 may be configured to convert high-voltage power from the M/G 118 to low-voltage power. For example, high-voltage power may be supplied at a voltage level that is compatible with the traction battery (e.g., 300 Volts). Low-voltage power may be supplied at a voltage level that is compatible with the auxiliary battery 160 (e.g., 12 Volts). The power converter module 158 may be a DC/DC converter that is configured to convert voltage from the high-voltage bus 154 to a voltage level compatible with the low-voltage power bus 166 (e.g., 12 Volts). The power converter 158 may be further configured to convert voltage from the low-voltage power bus 166 to voltage compatible with the high-voltage bus 154. For example, the power converter 158 may be configured to provide a bi-directional flow of current between the high-voltage bus 154 and the low-voltage power bus 166 depending on the operating mode.

The vehicle 110 may include a display. For example, the display may be a part if an instrument panel. The display may include lamps, lights and/or other indicators for alerting the operator of conditions related to the vehicle. The display may be a liquid crystal display (LCD) module. The display may be in communication with controllers (e.g., PCU 150) that are coupled to a communication bus.

Figure 2:
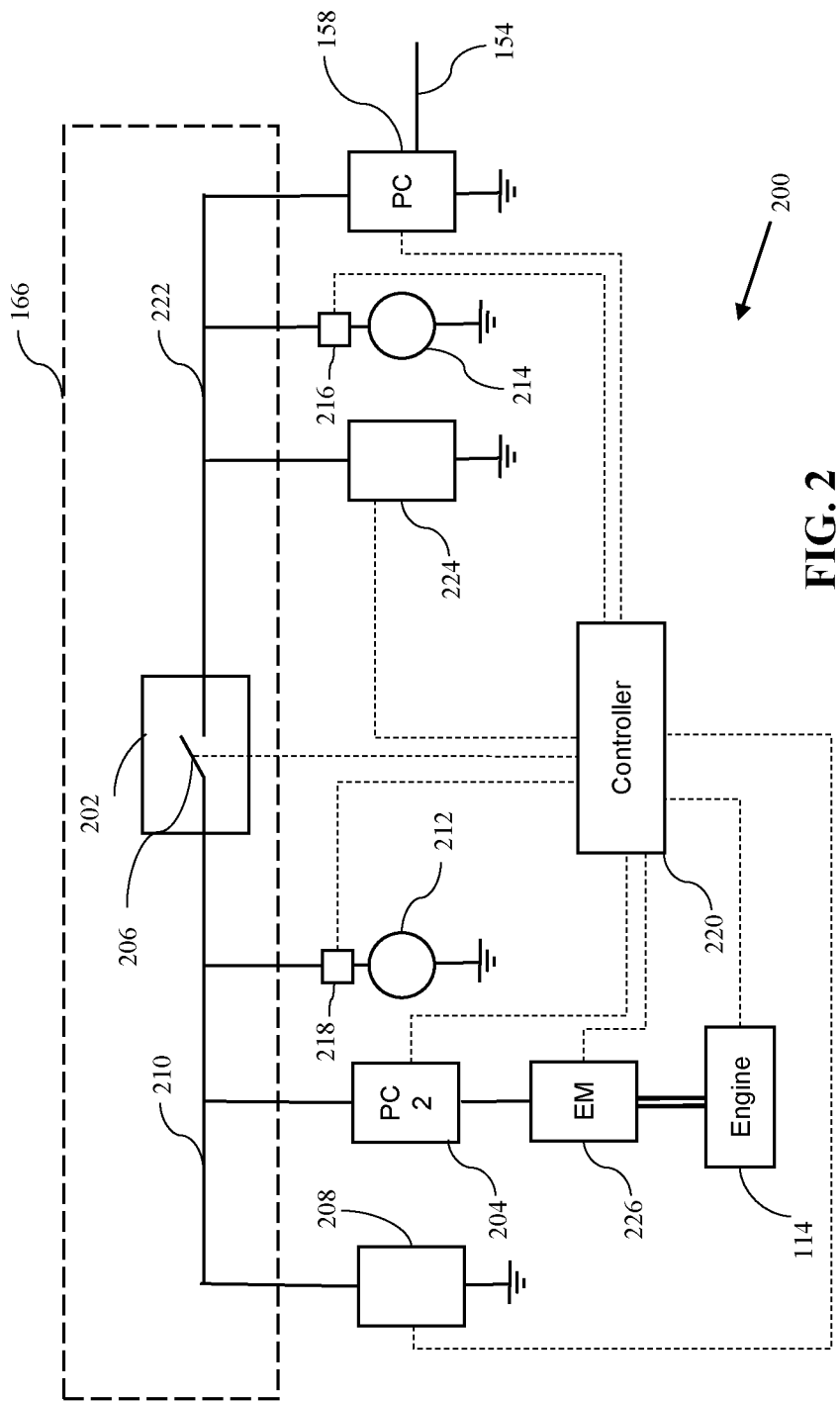
FIG. 2 is a diagram of a low-voltage power distribution system for a vehicle.

FIG. 2 depicts a possible power distribution system 200 for a vehicle. The power distribution system 200 may include the power converter 158 that is coupled between the high-voltage bus 154 and the low-voltage power network 166. The low-voltage power network 166 may be comprised of a first low-voltage bus 222 and a second low-voltage bus 210. An isolation switch 202 may be disposed between the first low-voltage bus 222 and the second low-voltage bus 210.

The power converter 158 may be characterized by a power limit. The power limit may identify a maximum amount of power that may transferred by the power converter 158. The power limit may be a function of a power rating of switching devices and/or a current capability of wiring within the power converter 158. The power limit may vary during operation of the power converter 158. For example, the power converter 158 may have a decreased power limit at higher temperatures. Reducing the power limit may prevent the power converter 158 from overheating during extreme operating conditions. The power converter 158 may increase and decrease the power limit based on the operating conditions.

A first auxiliary battery 214 may be electrically coupled to the first low-voltage bus 222. A first set of electrical loads 224 may be electrically coupled to the first low-voltage bus 222 and receive power from the first low-voltage bus 222 when activated.

The isolation switch 202 may include a switching element 206. The isolation switch 202 may include a diode (not shown) in parallel with the switching element 206. The switching element 206 may be a transistor (e.g., metal oxide semiconductor field effect transistor (MOSFET)). The isolation switch 202 may be configured such that the switching element 206 is normally closed. In some configurations, the switching element 206 may be a relay. The switching element 206 may be configured such that, when closed, current may flow between the first low-voltage bus 222 to a second low-voltage bus 210. The isolation switch 202 may be referred to as a vehicle power relay. The isolation switch 202 may be capable of isolating portions of the low-voltage power network 166 from one another.

A second auxiliary battery 212 may be electrically coupled to the second low-voltage bus 210. An electric machine 226 of the low-voltage starter system 168 (e.g., BISG) may be electrically coupled to the second low-voltage bus 210 using a second power converter module 204. The electric machine 226 may be configured to generate low-voltage power when operated as a generator. The second power converter module 204 may be configured to convert a voltage from the electric machine 226 to a voltage compatible with the second low-voltage bus 210. For example, the electric machine 226 may provide an alternating current (AC) to the second power converter module 204 when driven by the engine 114. The second power converter module 204 may be configured to convert the AC power to a direct current (DC) voltage/current that is compatible with the second low-voltage bus 210 (e.g., 12 Volt DC voltage). The second power converter module 204 may also be configured to provide a voltage/current to the electric machine 226 to operate as a motor for starting the engine 114. The second power converter module 204 may include switching devices (e.g., solid-state transistors, relays) that are configured to selectively couple terminals of the electric machine 226 to terminals of the second low-voltage bus 210. Power transfer between the second low-voltage bus 210 and the electric machine 226 may be achieved by operating the switching devices.

A second set of electrical loads 208 may be electrically coupled to the second low-voltage bus 210. The second set of electrical loads 208 may include a cooling fan for the engine 114.

The isolation switch 202 may be operated in a closed position such that the first low-voltage bus 222 and the second low-voltage bus 210 are electrically coupled together and effectively function as a single low-voltage bus or power network. In the description that follows, it may be assumed that the isolation switch 202 is in the closed position so that a single low-voltage network is present.

The power distribution system 200 may include a controller 220. The controller 220 may be in communication with components within and external to the power distribution system 200. The controller 220 may include a hardwired interface for communication and may include a serial communication interface for communicating via a vehicle communication network (e.g., Controller Area Network). The controller 220 may communicate with the power converter 158 and the second power converter 204. The controller 220 may communicate with the PCU 150 that is associated with the engine 114. The controller 220 may further be in communication with the first and second sets of electrical loads 224, 208 that are coupled to the first low-voltage bus 222 and/or the second low-voltage bus 210.

Operation of the electrical loads 224, 208 creates a power demand on the low-voltage power network 166 (e.g., low-voltage power demand). The power demand of the low-voltage power network 166 may be characterized by a peak power demand or maximum total load power demand. The peak power demand may be a maximum possible power demand that may occur during vehicle operation. The peak power demand may occur during certain worst-case operating conditions.

The power demand on the low-voltage power network 166 may be satisfied with power from the auxiliary battery 214 and/or the second auxiliary battery 212. The power demand may also be satisfied with power provided by the power converter 158. In addition, the power demand may be satisfied with power from the second power converter 204 that is derived from the electric machine 226 driven by the engine 114.

Under normal operating conditions, it may be desired to support the low-voltage power network 166 with power from the power converter 158. Under these conditions, the power converter 158 may transfer energy from the high-voltage bus 154 to the low-voltage power network 166. The power converter 158 may be controlled to output an amount of power to satisfy the power demand of the electrical loads 224, 208. In addition, the power converter 158 may be controlled to output power for charging the first auxiliary battery 214 and the second auxiliary battery 212. During normal load conditions, the power limit of the power converter 158 may be sufficient to satisfy the power demand on the low-voltage power network 166.

However, during some operating conditions, the power limit of the power converter 158 may be insufficient to satisfy the entire power demand on the low-voltage power network 166. During conditions in which the engine 114 is operating for long periods at high loads, the power demands for electrical loads associated with engine cooling may be increased. For example, an engine cooling fan may be activated to cool the engine coolant. The additional power demand of the engine cooling fan may cause the power demand on the low-voltage power network 166 to exceed the power limit of the power converter 158. Under this condition, the additional power demand may be satisfied with power from the first auxiliary battery 214 and/or the second auxiliary battery 212. However, drawing power from the auxiliary batteries 212, 214 may reduce the corresponding state of charge of the auxiliary batteries 212, 214. It may be desired to maintain the auxiliary batteries 212, 214 at a high state of charge so that battery power is available between ignition cycles.

Note that the extreme power demand may only occur on rare occasions. It is possible to design the power converter 158 to satisfy the extreme power demand, but at greater cost and size. To reduce cost and size of the power converter 158, it may be beneficial to design the power converter 158 for a power demand level that is less than the maximum possible low-voltage power demand. By reducing the maximum power capability of the power converter 158, other means of satisfying the maximum possible power demands may be implemented. The presence of the low-voltage starter system 168 (including electric machine 226) permits additional options for satisfying the power demand.

To prevent draining the auxiliary batteries 214, 212 during high-load conditions, it may be desired to operate the electric machine 226 to generate power to the low-voltage power network 166. Under a typical high-load condition, the engine 114 may be running at elevated speeds. The electric machine 226 may be controlled through the second power converter 204 to provide an amount of power to the low-voltage power network 166. A sum of power provided by the power converter 158 operating at the power limit and a power generation capability of the electric machine 226 may be at least equal to the maximum total load power demand of the low-voltage power network 166.

The controller 220 may be programmed to monitor the power demand of the low-voltage power network 166. The power converter 158 may be configured to monitor an amount of power transferred from the high-voltage network 154 to the low-voltage power network 166. For example, the power converter 158 may include a current sensor and a voltage sensor at the output of the power converter 158. The power converter 158 may include a control module that monitors the voltage and current to derive a power output. The power value may be communicated to the controller 220. In other configurations, signals from the current sensor and voltage sensor at the output of the power converter 158 may be routed to the controller 220. As described above, the power converter 158 may be characterized by a power limit. If the amount of power being output by the power converter 158 is at or near the power limit, then the controller 220 may determine that the power limit has been reached. In some configurations, a power value that is within a predetermined range of the power limit may indicate that the power limit has been reached. For example, an amount of power delivered that exceeds 95% of the power limit may be determined to have reached the power limit. The predetermined range may allow for component tolerances of the power converter 158.

The power demand of the low-voltage power network 166 may further be determined by monitoring power flow to and from the auxiliary batteries 214, 212. A first sensor unit 216 may be configured to measure a voltage and/or current of the first auxiliary battery 214. A second sensor unit 218 may be configure measure a voltage and/or current of the second auxiliary battery 212. The sensor units 216, 218 may include a current sensor configured to measure the current flowing to and from the associated battery. For example, the current sensor may be a current shunt or a Hall effect sensor. The sensor units 216, 218 may include a voltage sensor configured to measure a voltage across terminals of the associated battery. The voltage sensor may include a circuit configured to scale and filter the battery voltage to a level suitable for input to the controller 220.

Power transferred to or from the auxiliary batteries 212, 214 may be computed as the product of the associated voltage and current values. The power demand on the low-voltage power network 166 may exceed the power limit of the power converter 158 when it is determined that the power output of the power converter 158 has reached the power limit. The power demand may be determined to exceed the power limit when one or more of the auxiliary batteries 212, 214 are delivering power to the low-voltage power network 166 while the power converter 158 is operating at the power limit.

If the power demand of the low-voltage power network 166 exceeds the power limit of the power converter 158, the controller 220 may operate the electric machine 226 to generate power to the low-voltage power network 166 to satisfy the power demand. The power converter 158 may be operated at the power limit. The controller 220 may operate the electric machine 226 by controlling operation of the second power converter 204 and the engine 114. The controller 220 may monitor an engine speed to determine if the electric machine 226 will have sufficient power generation capability. If the engine 114 is presently stopped, the controller 220 may request that the engine 114 be started. The controller 220 may operate the second power converter 204 to operate the electric machine 226 as a motor to crank the engine 114. Once the engine 114 is running, the controller 220 may request the engine 114 to operate at an engine speed that is sufficient to generate a desired power output of the electric machine 226 and the second power converter 204 to satisfy the power demand.

If the power demand of the low-voltage network 166 is less than or equal to the power limit of the power converter 158 and the power converter 158 is operational, the controller 220 may operate only the power converter 158 to satisfy the power demand. The power converter 158 may be operational when there are no conditions present that inhibit the transfer of power through the power converter 158.

The power output of the second power converter 204 may be controlled to an amount of power that is the difference between the power demand and the power limit of the power converter 158. In some configuration, the power output may be controlled to a predetermined amount of power. In other configurations, the power output of the second power converter 204 may be dynamically changed such that power flowing into or from the batteries 212, 214 is less than a predetermined threshold.

Under some conditions, the power converter 158 may be unable to transfer power from the high-voltage bus 154. For example, the power converter 158 may be inoperable. For example, high temperature operation of the power converter 158 may cause internal switching devices to reach a critical temperature. To protect the switching devices, the switching devices may be switched off to prevent further degradation. The switching devices may be switched off until the temperatures falls below a predetermined temperature. The power converter 158 may be permanently or temporarily unable to transfer power. In response to the power converter 158 being unable to transfer power between the high-voltage bus 154 and the low-voltage power network 166, the controller 220 may be programmed to operate the electric machine 226 to generate power. The amount of power generated may be the lesser of the power demand of the low-voltage power network 166 and the power limit of the electric machine 226.

The controller 220 may be further programmed to operate the electric machine 226 to generate power in response to activation of predetermined electrical loads. The predetermined electrical loads may include infrequently used electrical loads that are configured to request high levels of power demand. For example, the predetermined electrical loads may include the engine cooling fan. It may be anticipated that the engine cooling fan may be activated during heavy engine loads that occur infrequently.

Figure 3:
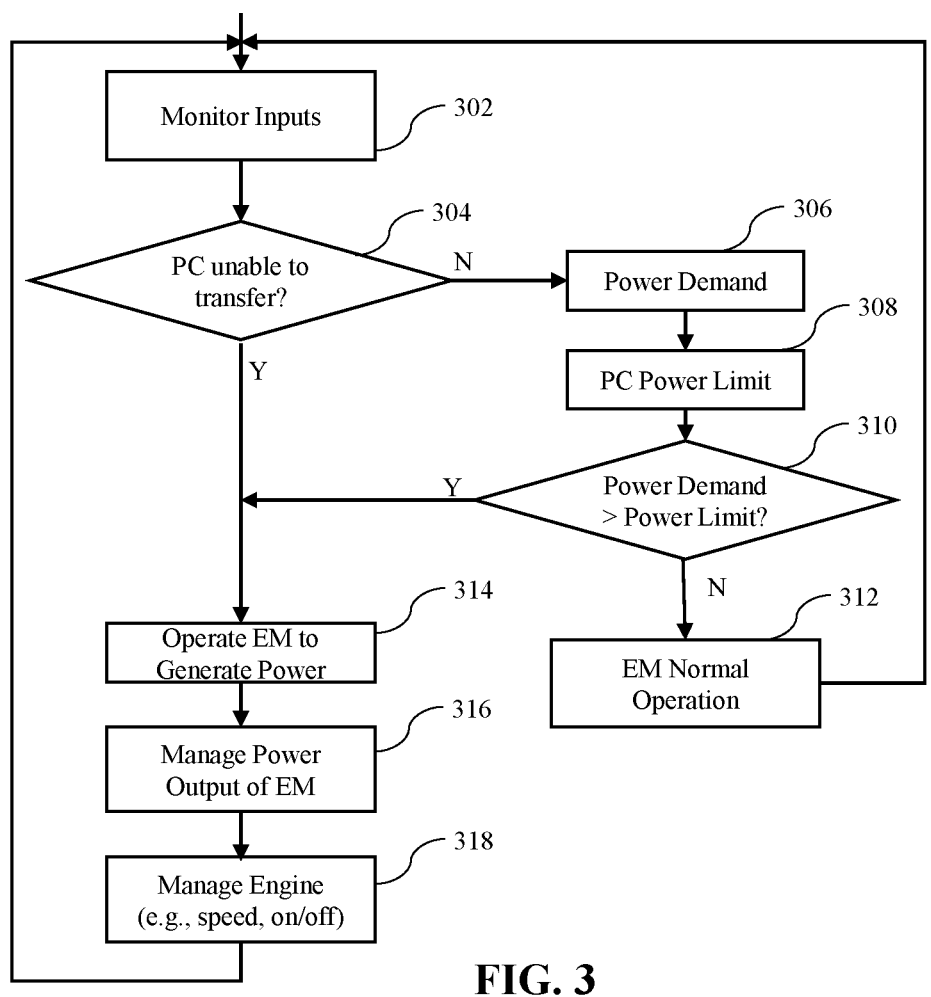
FIG. 3 is a flowchart for a possible sequence of operations for operating a supplemental power supply under certain conditions.

FIG. 3 depicts a flow chart of a possible sequence of operations to implement the power distribution system. The operations may be implemented in a controller (e.g., 220). At operation 302, inputs are collected and monitored. For example, status information may be received from the power converter 158, voltages and currents from the sensors may be measured and stored. Information for determining the power demand and power limit may be received and/or computed based on the received and measured inputs. The power converter 158 may be configured to communicate status information. For example, the power converter 158 may communicate any diagnostic codes that may render the power converter 158 unable to transfer power. In addition, the power converter 158 may communicate any power limit information.

At operation 304, a check may be made to determine if the power converter 158 is unable to transfer power. For example, in the event of a malfunction, the power converter 158 may be unable to operate and the power converter 158 may send a diagnostic code or indicator indicative of the condition. If the power converter 158 is unable to transfer power, operation 314 may be performed.

If the power converter 158 is determined to be capable of power transfer, then operation 306 may be performed. At operation 306, power demand of the low-voltage power network 166 may be determined. The power demand may be determined by voltage and current measurements as described previously herein. In addition, the inputs may include status and operational information regarding the electrical loads. At operation 308, the power limit of the power converter 158 may be determined. The power limit may be a stored value. The power limit may be a table of stored values indexed by an operational parameter (e.g., temperature). The power limit may be a value received from the power converter 158. At operation 310, the power demand is compared to the power limit. If the power demand is less than or equal to the power limit, then operation 312 may be performed. At operation 312, the electric machine 226 may be operated normally. For example, the electric machine 226 may be normally idle. That is, the electric machine 226 may not be generating power nor operating as a motor. If the power demand is greater than the power limit, then operation 314 may be performed.

At operation 314, the electric machine 226 may be operated as a generator to generate power for the low-voltage power network 166. The second power converter 204 may be controlled to convert the power generated by the electric machine 226 to a form compatible with the low-voltage power network 166. At operation 316, the controller may manage the power output of the electric machine 226 by controlling the second power converter 204. For example, the electric machine 226 may be controlled to output an amount of power that is the difference between the power demand and the power limit. The power may be controlled by controlling the voltage and/or current supplied to the low-voltage power network 166. At operation 318, the controller may manage the engine 114. Managing the engine 114 may include controlling the engine speed so that the electric machine 226 may generate a sufficient amount of power. Managing the engine 114 may also include starting the engine 114 if the engine 114 is in a non-running state.

Operation of the electric machine 226 to generate power provides several benefits. The power converter 158 may be sized for nominal power demands on the low-voltage power network 166. The electric machine 226 and second power converter 204 may supplement the power converter 158 during peak power demands. By sizing the power converter 158 for nominal power demands instead of peak power demands, cost of the power converter 158 may be reduced. In addition, the electric machine 226 and second power converter 204 provide a secondary means of powering the low-voltage power network 166 when the power converter 158 is unable to transfer power. For example, some power may be provided to the low-voltage power network 166 in the event of an inoperable power converter 158. In such cases, the engine 114 may remain running to power the electric machine 226.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a first electric machine configured to generate low-voltage power; and
   a controller programmed to
   responsive to a low-voltage power demand exceeding a limit of a power converter configured to convert high-voltage power generated by a second electric machine to low-voltage power, operate the first electric machine and the power converter to satisfy the demand, and
   otherwise, responsive to the low-voltage power demand not exceeding the limit, operate only the power converter to satisfy the demand.

2. The vehicle of claim 1 wherein the controller is further programmed to, operate the first electric machine to generate an amount of power that is a difference between the demand and the limit.

3. The vehicle of claim 1 wherein the controller is further programmed to, responsive to the power converter being unable to convert high-voltage power to low-voltage power, operate only the first electric machine to satisfy the demand.

4. The vehicle of claim 3 wherein the controller is further programmed to operate the first electric machine to generate an amount of power that is the lesser of the demand and a power limit of the first electric machine.

5. The vehicle of claim 1 wherein the controller is further programmed to, responsive to the low-voltage power demand exceeding the limit and an engine coupled to the first electric machine being stopped, operate the first electric machine to crank the engine.

6. The vehicle of claim 1 wherein the controller is further programmed to, operate an engine coupled to the first electric machine at a speed that is at least a predetermined speed configured to cause the first electric machine to generate an amount of power to satisfy the demand.

7. The vehicle of claim 1 wherein the limit is less than a maximum possible low-voltage power demand.

8. The vehicle of claim 1 wherein a sum of the limit and a power capability of the first electric machine is at least equal a maximum possible low-voltage power.

9. A method comprising:
   converting, by a power converter, high-voltage power generated by a first electric machine to low-voltage power;
   operating the power converter and a second electric machine, that is configured to generate low-voltage power, responsive to a low-voltage power demand exceeding a limit of the power converter; and operating only the power converter to satisfy the demand otherwise, responsive to the low-voltage power demand not exceeding the limit.

10. The method of claim 9 further comprising operating the second electric machine to crank an engine that is coupled to the second electric machine responsive to the demand exceeding the limit and the engine being stopped.

11. The method of claim 9 further comprising operating only the second electric machine to generate low-voltage power responsive to the power converter being unable to convert high-voltage power to low-voltage power.

12. The method of claim 11 wherein an amount of power generated by the second electric machine is a lesser of the low-voltage power demand and a power limit of the second electric machine.

13. The method of claim 11 further comprising operating an engine coupled to the second electric machine at a speed that is at least a predetermined speed configured to cause the second electric machine to generate an amount of low-voltage power to satisfy the demand.

14. The method of claim 11 further comprising cranking an engine that is coupled to the second electric machine responsive to the engine being stopped.

15. The method of claim 9 wherein the limit is less than a maximum possible low-voltage power demand.

16. A vehicle comprising:
a first electric machine configured to generate low-voltage power; and
a power converter configured to convert high-voltage power generated by a second electric machine to low-voltage power; and
a controller programmed to, responsive to the power converter being unable to convert high-voltage power to low-voltage power, operate the first electric machine to generate an amount of power to satisfy a low-voltage power demand.

17. The vehicle of claim 16 wherein the controller is further programmed to operate the first electric machine to generate the amount of power that is the lesser of the low-voltage power demand and a power limit of the first electric machine.

18. The vehicle of claim 16 wherein the controller is further programmed to, responsive to the power converter being able to convert high-voltage power to low-voltage power and the low-voltage power demand exceeding a limit of the power converter, operate the first electric machine and the power converter to satisfy the low-voltage power demand.

19. The vehicle of claim 18 wherein the limit is less than a maximum possible low-voltage power demand.

20. The vehicle of claim 16 wherein operating the first electric machine includes operating an engine configured to drive the first electric machine at a speed that is at least a predetermined speed configured to cause the first electric machine to generate the amount of power.

* * * * *